United States Patent [19]

Linberg et al.

[11] Patent Number: 5,391,110
[45] Date of Patent: Feb. 21, 1995

[54] EXHAUST GAS DISCHARGE APPARATUS

[76] Inventors: G. Douglas Linberg, 3003 Stuart Way, Lansdale, Pa. 19446; David J. Linberg, 143 Jefferson Ct.; Gregory Linberg, both of Norristown, Pa. 19401

[21] Appl. No.: 260,303

[22] Filed: Jun. 15, 1994

[51] Int. Cl.6 ............................................. F23J 11/02
[52] U.S. Cl. .................................. 454/64; 285/177; 285/240; 285/272
[58] Field of Search ............... 285/177, 175, 240, 272, 285/276; 454/63, 64, 166, 167

[56] References Cited

U.S. PATENT DOCUMENTS

| 3,057,646 | 10/1962 | Brumagim | 285/272 X |
| 3,517,952 | 6/1970 | McCracken | 285/276 |
| 4,233,889 | 11/1980 | Nederman | 454/64 |
| 4,660,465 | 4/1987 | Jentzsch et al. | 454/64 |
| 4,724,751 | 2/1988 | Jentzsch et al. | 454/64 |
| 4,762,054 | 8/1988 | Melville et al. | 454/64 |
| 5,096,230 | 11/1992 | Pausch et al. | 285/9.1 |

FOREIGN PATENT DOCUMENTS 1308808  5/1987  U.S.S.R. ................. 454/64

Primary Examiner—Harold Joyce
Attorney, Agent, or Firm—Martin Fruitman

[57] ABSTRACT

The apparatus is a device for removing vehicle exhaust gases from a building. A sealed duct is installed under the floor of a building, and the duct includes a structure for supporting and guiding a hose dolly, a part of which travels within the duct. A flat seal is formed at the top of the duct at the level of the floor by flexible overlapping flaps which are raised and separated by the shape of the hose dolly as it moves along the sunken duct. An air cooled tail pipe coupling permits a hose connection between the hose dolly and a vehicle tail pipe without damage to the hose.

7 Claims, 4 Drawing Sheets

EXHAUST GAS DISCHARGE APPARATUS

BACKGROUND OF THE INVENTION

This invention deals generally with the collection and discharge of exhaust gases from motor vehicles operating within a building, and more specifically with a duct system installed below the floor of a garage and the wheeled hose dolly which travels along the buried duct.

The requirement that motor vehicle exhaust gases be removed from any enclosure within which a vehicle is operating is quite obvious since the carbon monoxide emitted from a vehicle exhaust is toxic. The existing devices to accomplish the direct discharge of such vehicle exhaust gases to the outside of the building are quite varied. They include everything from a simple flexible hose slipped over the tail pipe and through a hole in a garage door to multiple stations with blower driven overhead exhaust ducts from which flexible hoses hang down for attachment to the vehicles' exhaust pipes.

Another sizeable group of such exhaust systems includes the those which allow the hose to be moved along the length of the permanent overhead exhaust duct even when connected to a vehicle's exhaust. In such systems a vehicle's emissions can be discharged even while the vehicle moves through the building, and it permits the connection of the hose to vehicles of various sizes or in multiple locations. This movement of the hoses along an overhead exhaust duct is generally accomplished by means of a hose trolley which hangs from the exhaust duct which has a flexible seal to close a slot through which a pipe of the hose trolley extends into the duct.

In such arrangements, the flexible seal is spread open by the hose trolley as it moves along the duct, and the seal closes behind the trolley as it passes. Fortunately, the suction of the exhaust blower, which is pulling the vehicle exhaust fumes into the duct, also prevents those fumes from leaking out of the seals around the trolley or out of the many joints in the ducts required for a system of any size.

These exhaust systems with movable trolleys and multiple hoses hanging from the overhead dusts have several obvious disadvantages. Certainly the most obvious is the considerable visual clutter which they present. If a service garage has several bays on both sides of an access aisle, that means there will be a large flexible hose hanging down from the room's ceiling near the access aisle at the end of each service bay, and that two large ducts and a manifold connecting them will be suspended just below the room's ceiling. Along with the visual clutter, the overhead ductwork forces the construction of a taller building to maintain any given clearance height above the vehicles using the building.

Another disadvantage of the overhead systems arises from the location of the exhaust of many vehicles. When the tail pipe of a vehicle is located near the bottom of the vehicle, as it is for most automobiles and small trucks, and for some larger vehicles such as fire trucks, the pressure drop within the long hose reaching from near the ceiling almost to the floor can be quite high. Since this pressure drop is usually the greatest in the system, this forces the system's blower to be larger and more powerful than would be required if a lower pressure drop could be attained with shorter hose connections to the vehicle.

A more subtle disadvantage of the overhead duct system involves the occasional circumstance when a vehicle is driven out of the garage without first detaching the exhaust hose. With an overhead installation, if the hose breaks or the trolley falls, the hazards from the falling objects are quite severe. The hazard is clearly even greater if the misuse causes a part of the overhead ducts to break and fall.

SUMMARY OF THE INVENTION

The present invention overcomes all of these problems associated with the prior art vehicle exhaust duct systems by locating the exhaust ducts for the building just below the floor level instead of near the ceiling. This floor location dramatically reduces the length of the flexible hoses used to attach the exhaust duct to the vehicle tail pipe. Since the hose portion of the gas flow path has the smallest cross section and the highest pressure drop in the system, this reduction in length reduces the power requirement of the blower compared to that of an overhead duct system.

Of course, the absence of overhead ducts furnishes increased clearance for vehicle height without any increase in the building height itself, and it eliminates the need for the building structure to support the weight of the overhead exhaust ducts, manifold and blower.

Furthermore, in the circumstance when a vehicle is driven out without removal of the exhaust hose, the hose is much more likely to disconnect by simply sliding off the tail pipe because the pulling force of the vehicle is almost directly in line with the longitudinal axis of the hose. However, even in the worst case, the hose dolly is simply pulled along the ground after the vehicle until it hits a solidly anchored stop and the hose separates at a predetermined junction point, leaving a small section of hose on the tail pipe of the vehicle. No parts fall from the ceiling, and the floor duct, which is cast within the concrete of the garage floor, remains intact and in place.

These benefits are attained by using a duct which is set into the material of the garage floor, which is usually concrete, and by constructing the duct with essentially two chambers. The lower chamber is connected to an exhaust blower and is used as a duct for the movement of the exhaust gases, and the upper chamber forms both an extension of the lower chamber and a guide track for the hose dolly. In the preferred embodiment, the lower chamber is a large polyvinyl chloride pipe which is set into the floor of the building with its top surface a few inches below the floor surface. This pipe has a series of through slots cut in its upper surface so that the slots run parallel to the pipe axis for the entire length of the travel of the hose dolly. The upper chamber is then attached above the slot in the pipe so that it is sealed to the pipe. The mechanical attachment of the two chambers is by means of clamps installed around the pipe or by brackets fastened to the sides of the pipe. The seal between the two chambers is aided by metal flashing attached across the external junction of the chambers, but the most effective portion of the seal is the concrete poured around and covering the sides of the duct once it is assembled.

The upper chamber serves as the support and track for the hose dolly and includes a gas seal which is located at the floor surface level, covers the exposed top surface of the upper chamber and is flat when the hose dolly is not in the vicinity. The seal also permits the hose dolly to move along the chamber and maintains a gas seal with the hose dolly itself as it moves. This is accomplished by the use of two overlapping flaps which normally lie flat in the horizontal plane and are lifted and flexed into the near vertical plane by the shape of the hose dolly. While the flaps are vertical they remain in tight contact with the hose dolly, thus maintaining the gas seal around the lower portion of the dolly. The upper chamber has flat top and bottom surfaces, and is rectangular in cross section. To interconnect to the lower chamber, the bottom of the upper chamber has a slot which is parallel to and located adjacent to the slot of the lower chamber. The top of the upper chamber is also constructed with a slot, and, although covered by the seal, this top slot is sized to permit a portion of the hose dolly to protrude through from within the upper chamber to the space above the chamber where a hose is attached to the hose dolly.

The hose dolly is constructed to roll within the upper chamber and to protrude above the upper chamber's top surface which is located at floor level, so that the hose is attached above floor level and on a swivel elbow which orients the axis of the hose in a horizontal plane and locates the hose at approximately the height of the vehicle tail pipe. The lower portion of the hose dolly has multiple sets of wheels with some oriented to rotate in vertical planes and some oriented to rotate in horizontal planes.

The hose dolly wheels set in vertical planes straddle the slot in the bottom wall of the upper chamber and one set contacts and runs upon the bottom inside surface of the upper chamber, while a second set contacts and runs upon the underside of the top wall of the upper chamber. Thus, the bottom of the upper chamber essentially forms a track for the vertical wheels of the hose dolly while the second set of wheels prevents the dolly from being lifted up within the upper chamber. The horizontal wheels of the hose dolly are located on both sides of the bottom of the dolly so that they contact the sides of the upper chamber. These horizontal wheels thereby guide the hose dolly along the upper chamber and prevent contact and excessive friction between the body of the hose dolly and the sides of the upper chamber.

From the region of its wheels to and above the top of the upper chamber and ground level, the hose dolly is essentially a vertical duct formed within a relatively narrow structure which is shaped somewhat like a canoe, and for much the same reason. The hose dolly is shaped to slice its way through the flat, horizontal, overlapping seal sections, and to lift them up so that they lie against and seal with the vertical sides of the dolly. Thus, the hose dolly is shaped so that, as it moves along the buried duct, it lifts the two horizontal rubber seal flaps, gradually separates them and deflects them into a near vertical plane. This movement of the flaps is done while essentially maintaining full contact between the flaps and the dolly sides so that little air is drawn into the duct around the dolly.

The present invention thereby furnishes an exhaust duct system with a mobile hose dolly which uses less power than comparable systems, requires no extra building height or structural strength, is less intrusive upon other building activities, and is not dangerous if a vehicle is driven from its location without first disconnecting the exhaust hose.

DETAILED DESCRIPTION OF THE INVENTION

Figure 1:
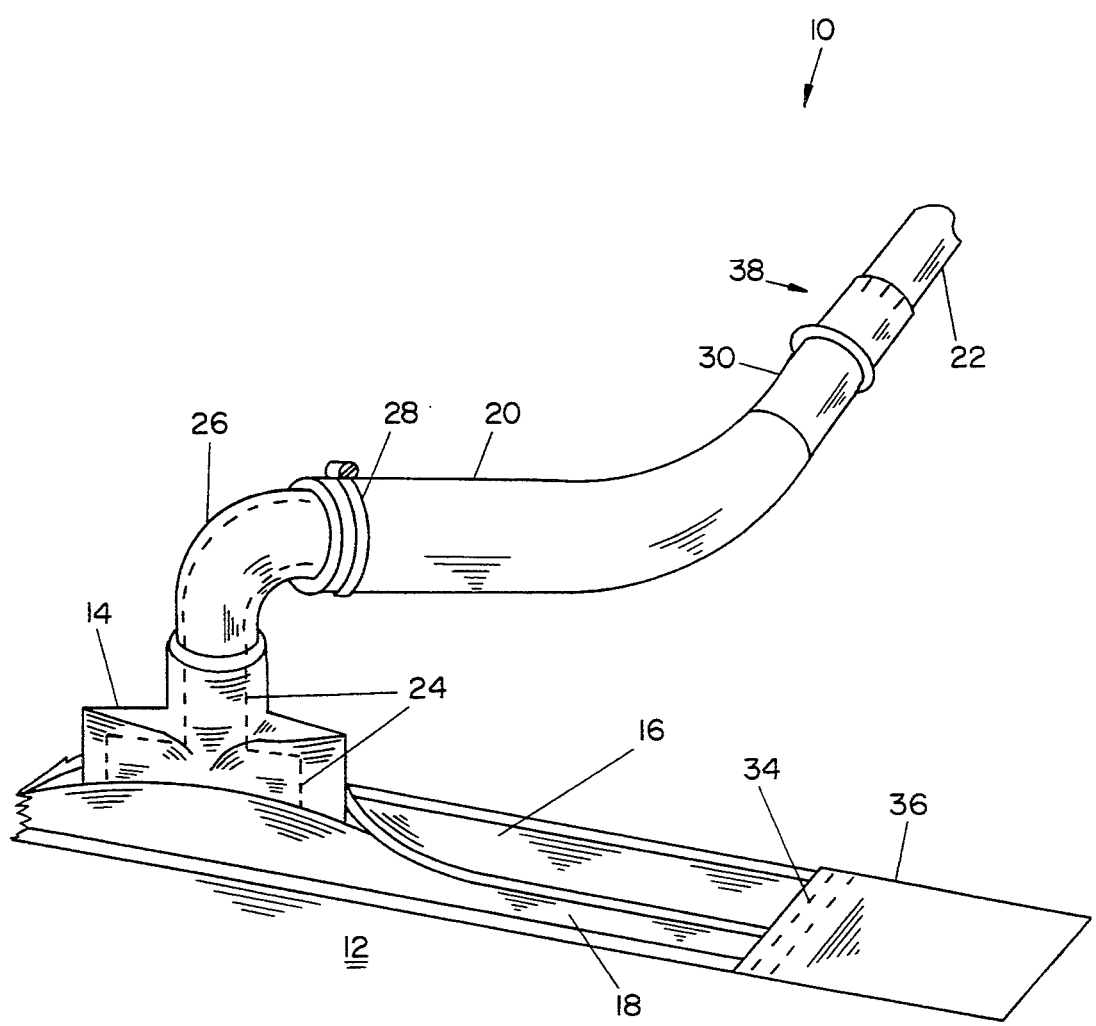
FIG. 1 is perspective view of the preferred embodiment of the invention installed in the floor of a building.

FIG. 1 is a perspective view of the preferred embodiment of invention in which building exhaust system 10 is installed below floor level 12 so that it conveniently and safely removes vehicle exhaust gases from a building. Building exhaust system 10 is constructed with hose dolly 14 movable within a duct (shown in and described in regard to FIG. 2) which is installed below floor level 12 and is cast in concrete or some other suitable floor material. The duct below floor 12 is covered by overlapping flaps 16 and 18 which are located at or near the floor surface, and, when hose dolly 14 is not in the vicinity, flaps 16 and 18 cover the duct to form a gas seal which prevents air from the building from entering the duct.

Hose dolly 14 is shaped so that, as it moves along the duct, it lifts and flexes the nearby portions of flaps 16 and 18 so that the flaps move from the horizontal plane to a near vertical plane to permit hose dolly 14 to pass between the flaps. The shapes of the surfaces of hose dolly 14 are selected so that they continue to maintain contact with flaps 16 and 18 regardless of the position of the flaps, thus maintaining an effective air seal between flaps 16 and 18 and hose dolly 14 to prevent air leakage between them.

The essential function of hose dolly 14 is to permit mobility for hose 20 which connects vehicle tail pipe 22 to the duct installed below floor 12. Hose dolly 14 therefore includes internal passage 24 which extends all the way through hose dolly 14 from its bottom within the below ground duct to swivel elbow 26 which is connected to hose 20. Hose 20 is clamped onto swivel elbow 26 at one end with conventional hose clamp 28, and at the other end hose 20 is connected to adapter hose 30 by only a friction fit.

The simple friction fit between hose 20 and adapter hose 30 forms a prescribed weakened element to limit failure within the apparatus if a vehicle is driven away without first disconnecting the hoses from its tail pipe. If under the stress of a vehicle pulling away the hoses do not slip off the tail pipe, the hoses will separate from each other at their junction. This separation will occur when hose dolly 14 stops moving as it hits end stop 34 installed under duct access plate 36.

Adapter hose 30 is attached to vehicle tail pipe 22 by the use of tail pipe coupling 38 which furnishes a round polished surface to make the frequent removal and installation of the hoses easier and more convenient. This is desirable in some applications, for instance in fire Stations, where the same vehicles are repeatedly attached to, and removed from building exhaust system 10. The structure of tail pipe coupling 38 is shown in and described in regard to FIG. 4.

Figure 2:
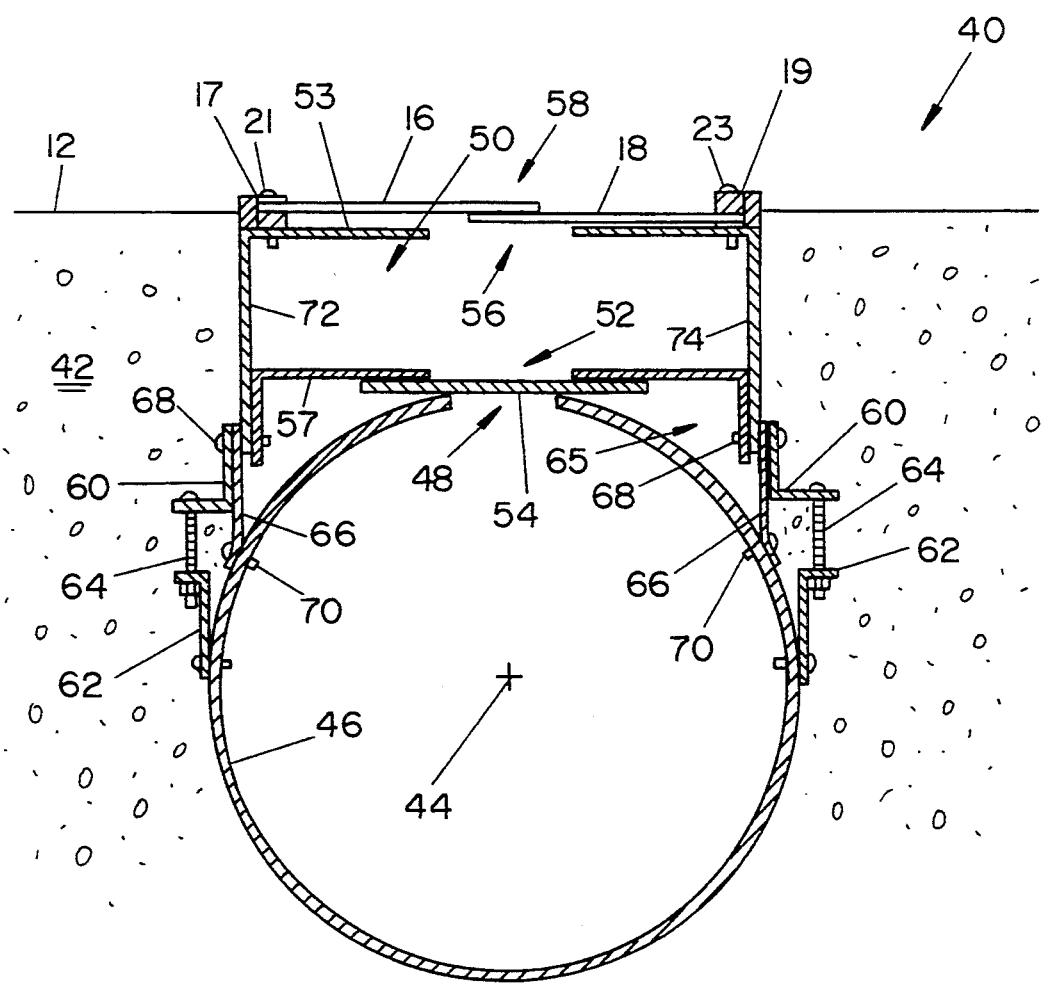
FIG. 2 is a cross section view of the duct of the invention taken across the axis of the gas flow path.

FIG. 2 is a cross section view of duct 40 which is installed below floor level 12 and around which is cast concrete base 42. The view of FIG. 2 is taken across central axis 44 of lower chamber 46, which is easily formed from polyvinyl chloride pipe, but can be any structural material. In the preferred embodiment of the invention, lower chamber 46 is 10 inches in diameter. The major feature of lower chamber 46 is that it has through slot 48 cut along its upper surface so that gases will be removed from upper chamber 50 by an exhaust blower (not shown) attached elsewhere along lower chamber 46.

Upper chamber 50 is attached to lower chamber 46 above slot 48 and includes matching slot 52 adjacent to slot 48. Slot 52 is continuous except for support structures such as strap 54 which are used to hold together and maintain the dimensions of upper chamber 50. Slots 48 and 52 thus form an essentially continuous opening by which the exhaust blower attached to lower chamber 46 also exhausts upper chamber 50.

Upper chamber 50 is essentially a rectangular cross section structure with slot 52 in bottom wall 57 and slot 56 in the top wall 53. Bottom wall 57 acts as a support and track for hose dolly 14, while slot 56 in top wall 53 permits hose dolly 14 to protrude out of upper chamber 50 and be connected above floor level to hose 20 (FIG. 1). Flaps 16 and 18 are held flat over slot 56 by clamp bars 17 and 19 which are held on top wall 53 by multiple screws 21 and 23. Flaps 16 and 18 seal against each other in overlap region 58 and thereby effectively seal upper chamber 50 off from air leakage from above ground level 12.

Upper chamber 50 is attached to lower chamber 46 by conventional clamping means. As shown in FIG. 2 angles 60 are attached to the exterior of upper chamber 50 and matching angles 62 are attached to the exterior of lower chamber 46 at multiple locations along the length of duct 40, and each set of angles is pulled together by a nut and bolt set 64. Since the entire assembly will be encased in concrete, any system connecting lower chamber 46 to upper chamber 50 need only be sufficient to serve during the construction process.

It is, however, desirable to seal junction region 65 between upper chamber 50 and lower chamber 46 to help prevent air leakage and to prevent any concrete from entering the chambers or clogging slot 48. This is accomplished by the use of metal flashing 66 which is attached along the length of the exterior of upper chamber 50 with screws 68 and to lower chamber 46 with screws 70.

Figure 3:
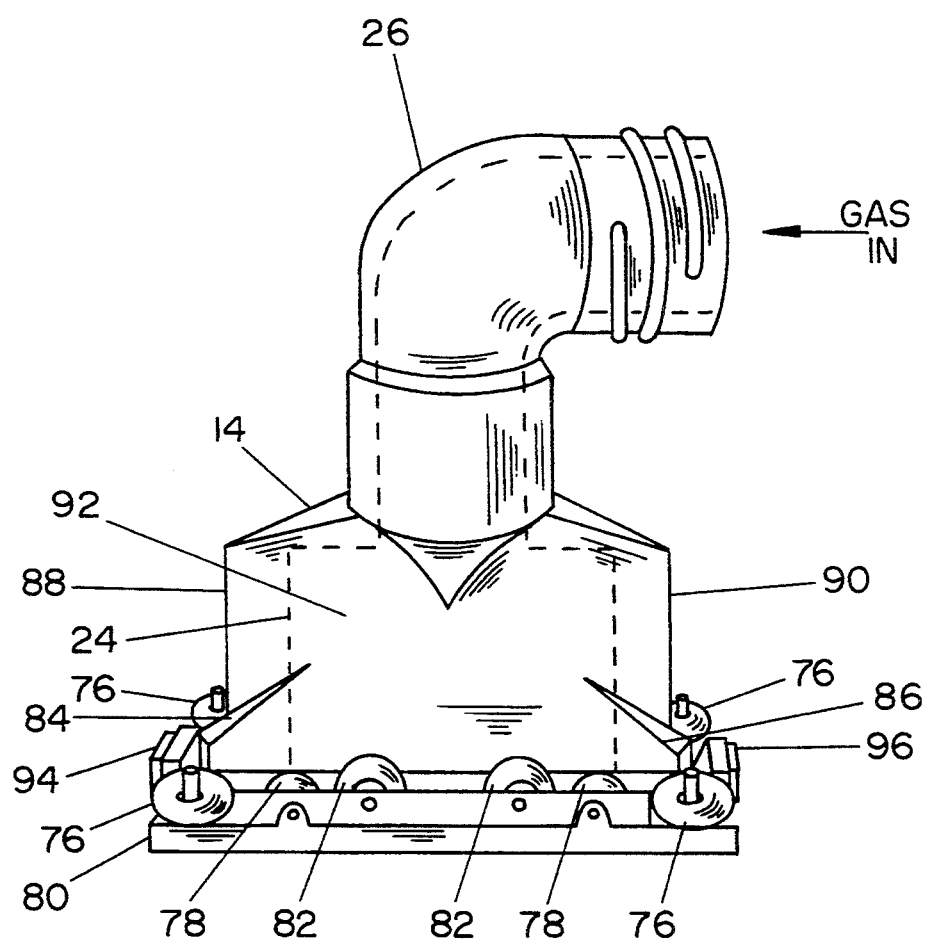
FIG. 3 is a side view of the hose dolly of the preferred embodiment of the invention when it is outside of the enclosing below ground duct.

FIG. 3 is a side view of hose dolly 14 before it is installed within duct 40. Hose dolly 14 is constructed so that its movement within upper chamber 50 is controlled and limited only to movement along the length of upper chamber 50. Side movement is prevented by horizontal wheels 76 which are located so that they are in continuous contact with sides 72 and 74 of upper chamber 50 (FIG. 2).

Vertical wheels 78, along with similarly located wheels on the other side of hose dolly 14 which cannot be seen, extend slightly below base 80 and contacts bottom wall 57 of upper chamber 50 (FIG. 2), permitting hose dolly 14 to roll along the length of upper chamber 50. Vertical wheels 82, along with similarly located wheels on the other side of hose dolly 14 which cannot be seen, are located slightly higher than are vertical wheels 78 so that vertical wheels 82 are in constant contact with top wall 53 of upper chamber 50 (FIG. 2). Thus, vertical wheels 82 prevent hose dolly 14 from being lifted off of the track formed by bottom wall 57 of upper chamber 50 (FIG. 2).

Hose dolly 14 is constructed with internal through passage 24 within it so that gas flowing into swivel elbow 26 flows down through passage 24 and enters into duct 40 (FIG. 2). Hose dolly 14 is also constructed with specific surfaces which control the movement of flaps 16 and 18 (FIG. 1) as hose dolly 14 moves along duct 40. Lifting surfaces 84 and 86 and similar surfaces on the opposite side are therefore oriented at an angle to the horizontal plane in which hose dolly moves, so that as shown in FIG. 1, as hose dolly 14 moves, it lifts flaps 16 and 18 up from their flat position.

Hose dolly 14 also includes wedge structures 88 and 90 on its leading and trailing edges. These wedge structures gradually separate and flex the lifted flaps as hose dolly 14 moves between them, and flaps 16 and 18 therefore lie tightly against the sides 92 of hose dolly 14, thus preventing air leakage around hose dolly 14. The specific angles of wedge structures 88 and 90 and of lifting surfaces 84 and 86 are dependent upon the flexibility and the width of flaps 16 and 18 so that the angles are best determined by experimentation once the flaps are designed. An additional feature of hose dolly 14 is the inclusion of bumpers 94 and 96 on either end of the structure. These bumpers have rubber pads on the end surfaces so that there is no damage to hose dolly 14 when it is pulled into stop 34 (FIG. 1) at the end of duct 40.

Figure 4:
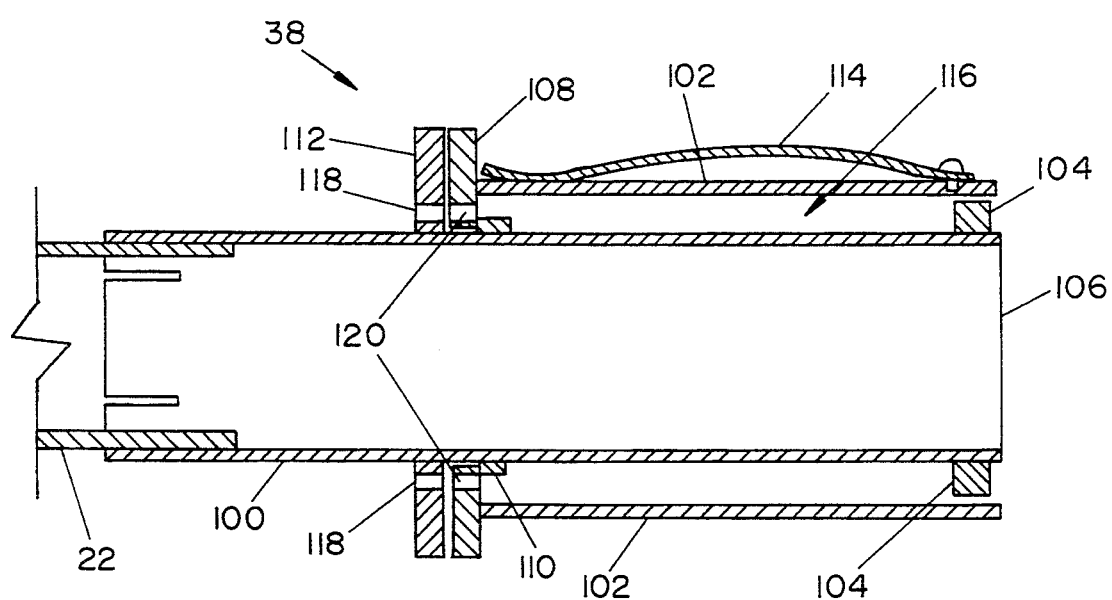
FIG. 4 is a cross section view of the vehicle tail pipe coupling of the preferred embodiment of the invention.

FIG. 4 is a cross section view of a tail pipe coupling which may be used with the buildings exhaust system of the present invention. In some applications, the same vehicles are repeatedly attached to the same building exhaust system. One such application is in fire stations where fire trucks are backed in and operated for service procedures while in the building. Under such circumstances it is desirable to use a tail pipe coupling so that the hose can be slipped onto and removed from a concentric, polished, machined surface rather than directly onto the vehicle tail pipe, in order to assure a more effective and consistent seal between the hose and the tail pipe.

Tail pipe coupling 38 shown in FIG. 4 is such a coupling. It is constructed with inner pipe 100 which goes through the entire length of coupling 38 and outer pipe 102 which is rotatable upon inner pipe 100 to permit hose 30 (FIG. 1) to rotate relative to fixed vehicle tail pipe 22 as the vehicle moves relative to the other end of the hose which is attached to the hose dolly.

This rotation is accomplished very simply by attaching several spacers 104 to inner pipe 100 around its end 106 which will be inserted into the hose. One end of outer pipe 102 then simply slips on spacers 104 as outer pipe 102 rotates. The other end of pipe 102 is attached, preferably welded, to flange 108 which extends radially inward to rest on inner pipe 100, but it is not attached to pipe 100. Thus, as outer pipe 102 rotates, flange 108 also slips around inner pipe 100. Flange 108 and outer pipe 102 are prevented from slipping off inner pipe 100 by lock ring 110 which is attached to inner pipe 100 and is located adjacent to flange 108. Second flange 112 is attached to inner pipe 100 on the side of flange 108 opposite from lock ring 110 to also prevent any movement of flange 108 toward tail pipe 22, thus preventing any significant movement of outer pipe 102 in the direction parallel to its axis. Spring finger 114 is attached to the outside surface of outer pipe 102 so that the hose which is slipped over outer pipe 102 will be held onto pipe 102 and will not slip off unless significant force is applied to remove it.

A significant benefit of tail pipe coupling 38 is that it does not require the attachment of any permanent metal fixture to the end of hose 30. Thus, when hose 30 is removed from coupling 38 by sliding it off of outer pipe 102, there is nothing attached to hose 30 to scratch or damage the vehicle. In fact, even if either hose 20 or hose 30 is run over by a vehicle, the hose simply is temporarily flattened, and it returns to its normal shape when the vehicle moves on. No damage occurs to either the hose or the vehicle.

Tail pipe coupling 38 is also constructed to cool the exhaust gases entering coupling 38 from tail pipe 22, so that the hoses attached to coupling 38 are not damaged by high temperatures. This cooling is accomplished by drawing building air into tail pipe coupling 38 so that it mixes with and cools the exhaust gases entering tail pip coupling 38 from tail pipe 22. In order to draw air in, coupling 38 is furnished with several openings which interconnect space 116 between outer pipe 102 and inner pipe 100 to the cooler air around tail pipe coupling 38. Since the hose covers the outside of outer pipe 102, these openings to annular space 116 draw outside air in because of the negative pressure created in the hose by the system blower. Moreover, since the cool air coming into annular space 116 first cools outer pipe 102 and then enters the attached hose adjacent to the hose wall, the cool air protects the hose from the exhaust gases at the locations where the exhaust gases are at the hottest temperatures.

In the preferred embodiment of the invention, the air openings into coupling 38 are located within flanges 108 and 112. Flange 112 includes several annular slots 118 in the region of flange 112 which is opposite annular space 116. Similarly, flange 108 also has annular slots 120 located so that they open into annular space 116 and overlap annular slots 118 in flange 112. Thus, regardless of the rotation of outer pipe 102 and flange 108, at least some portion of slots 118 overlap with some portion of slots 120 and provide air access to annular space 116.

The present invention therefore provides a building exhaust system for vehicle exhaust gases which is easily accessible to tail pipes which are near the ground and reduces the blower power required for such systems while also reducing the required building height and preventing deterioration of the hoses attached to the tail pipes.

It is to be understood that the form of this invention as shown is merely a preferred embodiment. Various changes may be made in the function and arrangement of parts; equivalent means may be substituted for those illustrated and described; and certain feature may be used independently from others without departing from the spirit and scope of the invention as defined in the following claims.

For example, lower chamber 46 of duct 40 can be constructed of material other than PVC and be of a configuration which is not circular in cross section. Lower chamber 50 can also be of a different configuration as long as it contains structures guiding the wheels of hose dolly 14. Moreover, duct 40 need not even have two chambers, since the features of the two chambers of the preferred embodiment can be combined into a single chamber. Furthermore, although the invention has been described as being used for a vehicle exhaust located within a garage, it can be used with any source of gases which are to be removed from an enclosure. It should also be appreciated that it is quite practical to operate more than one hose dolly 14 on a single duct 40, thus making it possible to serve more than one vehicle from a single duct.

What is claimed as new and for which Letters Patent of the United States are desired to be secured is:

1. An apparatus for the removal of gases from a source within a building, comprising:

a blower evacuated sealed duct installed below a building floor, with the duct including a structure with a top wall located adjacent to the floor and the top wall including a slot which is an opening between the duct and the space above the floor, a bottom surface spaced from and located below the top wall, and first and second spaced apart side surfaces located between the top wall and the bottom surface;

a sealing means covering the slot, the sealing means comprising first and second flexible flaps located in a plane parallel to the floor, each flap with one edge overlapping the other flap and a second edge attached to the top wall of the duct;

a hose dolly comprising a structure with outer surfaces and an internal sealed passage which has a top opening located above the floor and a bottom opening located within the duct, with the hose dolly configured so that it fits through the slot in the top wall of the duct, and with the outer surfaces of the hose dolly shaped so that when the hose dolly outer surfaces contact the seal means they separate the flaps at their overlap and move the flaps from a position parallel to the floor to a position in which each flap is held against surfaces of the hose dolly which are transverse to the floor while the flaps prevent air flow between the outer surfaces of the dolly and the flaps;

wheels attached to the hose dolly and located within the duct, at least two wheels being positioned to roll on the bottom surface, at least one wheel being positioned to roll against the first side surface, and at least one wheel being positioned to roll against the second side surface; and a hose with one end connected to the top opening of the hose cart passage and a second end interconnected with a source of gases.

2. The apparatus of claim 1 further including at least two more wheels attached to the hose dolly and located within the duct and positioned to roll against the top wall of the duct.

3. The apparatus of claim 1 wherein the top opening of the passage in the hose dolly is an elbow which permits a hose connected to the opening to be oriented in a horizontal plane.

4. The apparatus of claim 1 wherein the top opening of the passage in the hose dolly is a swivel elbow which permits a hose connected to the opening to be oriented in a horizontal plane.

5. The apparatus of claim i further including a tail pipe coupling to attach the hose to a tail pipe of a vehicle, the tail pipe coupling comprising;

a first through pipe with a first diameter and a first length, with a first end of the first pipe dimensioned to fit tightly around a vehicle tail pipe;

a second pipe with a second diameter which is larger than the first diameter and a second length which is less than the first length, the second pipe being concentrically and rotatably attached around the first pipe to form an annular space between the first pipe and the second pipe; and openings at both ends of the annular space which permit air to flow through the annular space and exhaust gases to flow through the first pipe when a hose with a negative pressure is connected to the second pipe by inserting the second pipe within the hose.

6. The apparatus of claim 4 further including a spring holding means attached to the outside of the second pipe to retain a hose in place around the second pipe.

7. A tail pipe coupling apparatus to attach a hose to a tail pipe of a vehicle, the tail pipe coupling comprising;

a first through pipe with a first diameter and a first length, with a first end of the first pipe dimensioned to fit tightly around a vehicle tail pipe;

a second pipe with a second diameter which is larger than the first diameter and a second length which is less than the first length, the second pipe being concentrically and rotatably attached around the first pipe to form an annular space between the first pipe and the second pipe; and openings at both ends of the annular space which permit air to flow through the annular space and exhaust gases to flow through the first pipe when a hose with a negative pressure is connected to the second pipe by inserting the second pipe within the hose.

* * * * *